United States Patent [19]

Mizuno et al.

[11] Patent Number: 5,063,281
[45] Date of Patent: Nov. 5, 1991

[54] WEAVING WELDING METHOD

[75] Inventors: Toru Mizuno, Tama; Shigehiro Morikawa, Atsugi, both of Japan

[73] Assignee: Fanuc Ltd., Yamanashi, Japan

[21] Appl. No.: 427,102

[22] PCT Filed: Feb. 6, 1989

[86] PCT No.: PCT/JP89/00119

§ 371 Date: Oct. 6, 1989

§ 102(e) Date: Oct. 6, 1989

[87] PCT Pub. No.: WO89/07507

PCT Pub. Date: Aug. 24, 1989

[30] Foreign Application Priority Data

Feb. 10, 1988 [JP] Japan ................. 63-27648

[51] Int. Cl.$^5$ ............................................. B23K 9/127
[52] U.S. Cl. ................................................ 219/125.12
[58] Field of Search .................... 219/124.34, 125.12

[56] References Cited

U.S. PATENT DOCUMENTS

| | | | |
|---|---|---|---|
| 4,621,333 | 11/1986 | Watanabe | 219/125.12 |
| 4,635,206 | 1/1987 | Bhatia et al. | 219/125.12 |
| 4,677,276 | 6/1987 | Nio et al. | 219/125.12 |

FOREIGN PATENT DOCUMENTS 60-54275 3/1985 Japan .

*Primary Examiner*—Clifford C. Shaw
*Attorney, Agent, or Firm*—Staas & Halsey

[57] ABSTRACT

A weaving welding method is provided which permits an accurate and continuous weaving welding along various weld lines including a complicated weld line which is a combination of straight lines and arcs, based on a simple determination. In accordance with the previously predetermined start and end points of a first section of a desired weld line, the predetermined weaving width and the detected orientation of a welding torch, a weaving swing plane is determined which includes an intersection line at which a first plane traversing the desired weld line at right angles thereto intersects a second plane perpendicular to the axis of the welding torch, and is parallel to the desired weld line (S2). The torch is then moved along the desired weld line while moved in a weaving pattern with a predetermined weaving width in a direction traversing the desired weld line, such that the distal end thereof is moved on the weaving swing plane (S3). During the execution of these steps, the desired weld line is corrected in accordance with the detected value of the welding current, so as to be coincident with the center line of a groove of a workpiece (S4). Then, the above process is carried out for the second section of the desired weld line.

6 Claims, 3 Drawing Sheets

WEAVING WELDING METHOD

BACKGROUND OF THE INVENTION

1. Field of the Invention

The present invention relates to a weaving welding method permitting a weaving welding based on simple technique.

2. Description of the Related Art

In a consumable electrode type arc welding robot, it is known to carry out weaving welding by moving the welding torch of the robot along a weld line while weaving the same within a groove of a workpiece in a direction traversing the weld line. In doing this, it is necessary to determine the plane in which the distal end of the welding torch is to be moved (hereinafter referred to as the weaving swing plane). Conventionally, the weaving swing plane is determined by giving the start and end points of a desired weld line coinciding with the center line of the groove and another point which is off the desired line, or by giving the desired weld line and the angle to be defined between the desired weld line and the weaving swing plane. This process, however, is complicated. If the desired weld line includes a plurality of sections of straight lines and/or arcs, the weaving swing plane must be determined for each of the sections, thus increasing the complexity. Further, if a deviation of the desired weld line from the center line of the groove occurs due to a machining error of the workpiece, a setting error of the workpiece relative to the robot, thermal distortion during welding, etc., the actual path of the welding torch, i.e., the actual weld line, becomes misaligned with the center line of the groove even though the welding torch is driven along the desired weld line. In such a case, the welding direction may be corrected to compensate for the deviation of the actual weld line from the center line of the groove moreover, this is not enough to achieve an accurate welding because the weaving swing plane has already been determined for the individual sections of the weld line.

SUMMARY OF THE INVENTION

An object of the present invention is to provide a weaving welding method which permits an accurate and continuous weaving welding along various weld lines including a complicated weld line which is a combination of straight lines and arcs, based on a simple determination.

To achieve the above object, the present invention provides a weaving welding method comprising the steps of: (a) determining a desired weld line, (b) detecting an orientation of a welding torch, (c) determining a weaving swing plane on the basis of the determined desired weld line and the detected orientation of the welding torch, the weaving swing plane including an intersecting line at which a first plane traversing the desired weld line at right angles thereto intersects a second plane perpendicular to an axis of the welding torch, and parallel to the desired weld line, and (d) moving the welding torch along the desired weld line while weaving the same with a predetermined width with respect to the desired weld line in a direction traversing the desired weld line, to move the distal end of the welding torch on the weaving swing plane.

When the desired weld line includes a plurality of sections each comprising one of a straight line and an arc, the above-mentioned steps (a) through (d) are executed for each of the sections, and preferably, a step of (e) correcting a deviation of the desired weld line from the center line of a groove of a workpiece, a step of (f) integrating a correction amount of each section, and a step of (g) correcting the desired weld line of each section in accordance with the integrated value of correction amounts obtained in the section preceding said each section are also executed.

Thus, according to the invention, the welding torch is moved along the desired weld line while woven with a predetermined width with respect to the desired weld line in a direction traversing the desired weld line, to move the distal end thereof on the weaving swing plane, which plane is determined based on the determined desired weld line and the detected orientation of the welding torch so that it includes an intersecting line at which the first plane traversing the desired weld line at right angles thereto intersects the second plane perpendicular to the axis of the welding torch and is parallel to the desired weld line. When the desired weld line includes a plurality of sections each comprising one of a straight line and an arc, the above-mentioned process is executed for each of the sections, and preferably, the desired weld line of each section is corrected in accordance with the integrated value of correction amounts obtained in the section preceding said each section and corresponding to the deviation of the desired weld line from the center line of the groove of the workpiece. Accordingly, it is possible to carry out an accurate and continuous weaving welding along various weld lines including a complicated weld line which is a combination of straight lines and arcs, based on simple teaching.

DETAILED DESCRIPTION OF THE PREFERRED EMBODIMENTS

Figure 2:
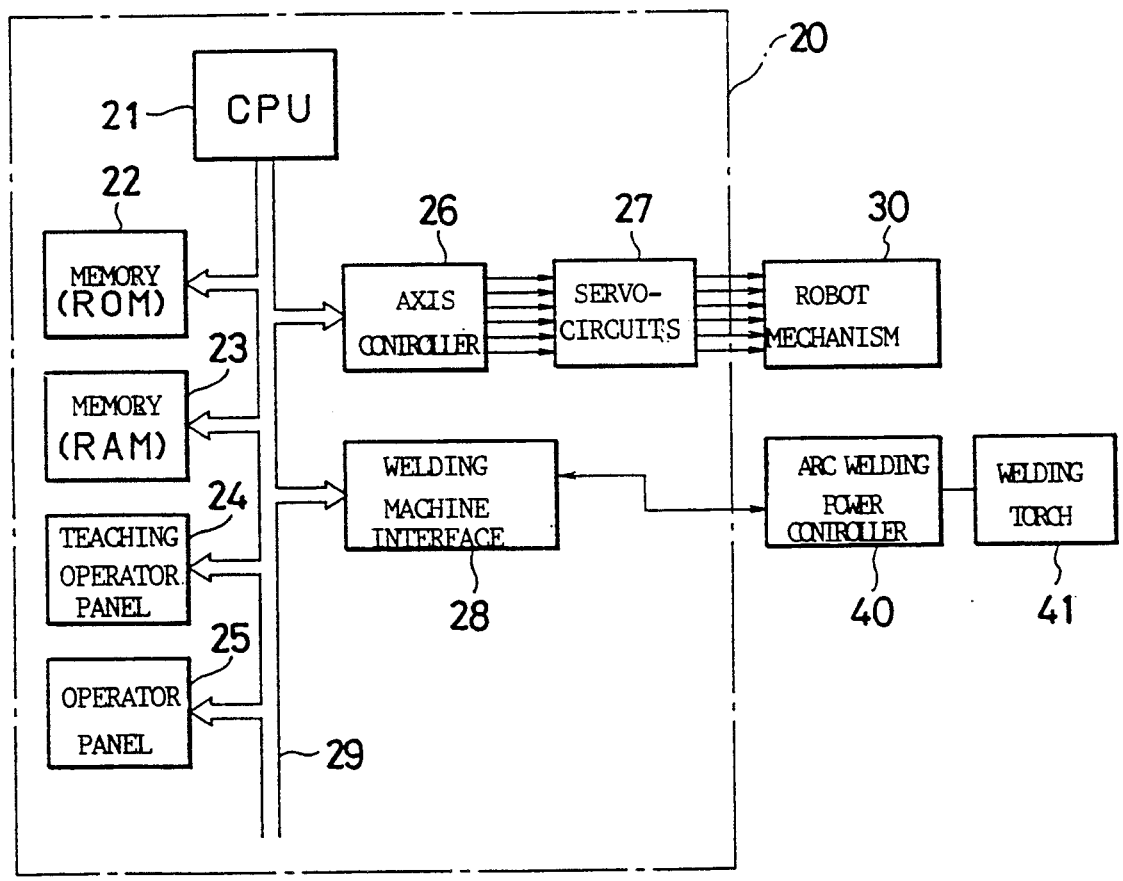
FIG. 2 is a block diagram of a principal part of a welding robot to which a weaving welding method according to an embodiment of the invention is applied.

In FIG. 2, a welding robot comprises a robot mechanism 30 including a wrist portion to which a welding torch 41 is attached. An arc welding power controller 40 is connected to the welding torch 41, as well as a control device 20 for controlling these elements 30 and 40. The control device 20 includes a central processing unit (hereinafter referred to as CPU) 21, and a ROM 22, a RAM 23, a teaching operator panel 24, an operator panel 25, an axis controller 26, and a welding machine interface 28, all connected to the CPU 21 through a bus 29. The control device 20 also includes servo-circuits 27 connected to the axis controller 26 for driving and controlling servomotors (not shown) for individual axes of the robot mechanism 30.

The ROM 22 stores various control programs executed by the CPU 21, and the RAM 23 stores teaching data, various control parameters and the like, which are inputted through the teaching operator panel 24, the operator panel 25, a tape reader (not shown), etc. The teaching operator panel 24 has a numerical display device and operating buttons (neither is shown) for operation of the robot, and the operator panel 25 has a CRT display device (not shown) and various keys including numerical keys and function keys (none shown) for inputting various data. The axis controller 26 includes an interpolator (not shown) for controlling a plurality of axes. Further, the welding robot is arranged to cause the RAM 23 to store, through an input/output circuit (not shown), detection data supplied from various sensors (not shown) provided at various sections of the robot mechanism 30 and representing the operating states of the respective portions when teaching to the robot is performed, while to cause the CPU 21 to read a welding current through the welding machine interface 28 when welding is carried out. Thus, the CPU 21 functions as an arc sensor. Moreover, the welding robot is designed to compare the welding currents at both the maximum amplitude positions of the welding torch in the weaving direction thereof, to thereby determine whether a deviation has occurred between a desired weld line taught beforehand to the robot and the center line of a groove of a workpiece (not shown), and automatically correct the weaving direction in accordance with the determination.

Now, a weaving welding method according to an embodiment of the invention, carried out by the welding robot constructed as above, will be described with reference to FIGS. 1 to 4.

Figure 1:
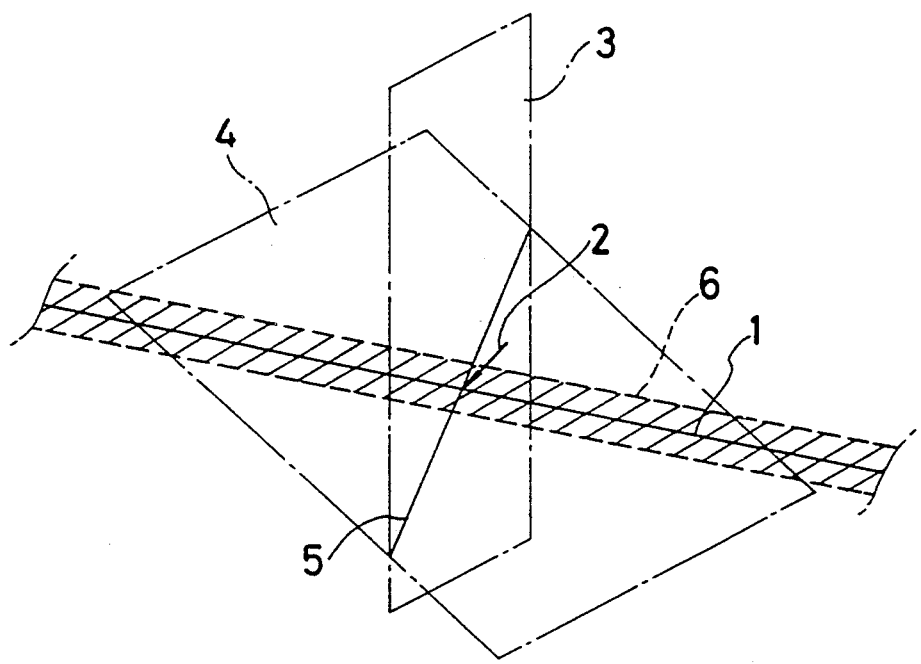
FIG. 1 is a schematic perspective view illustrating the principle of a weaving welding method according to the present invention.
Figure 4:
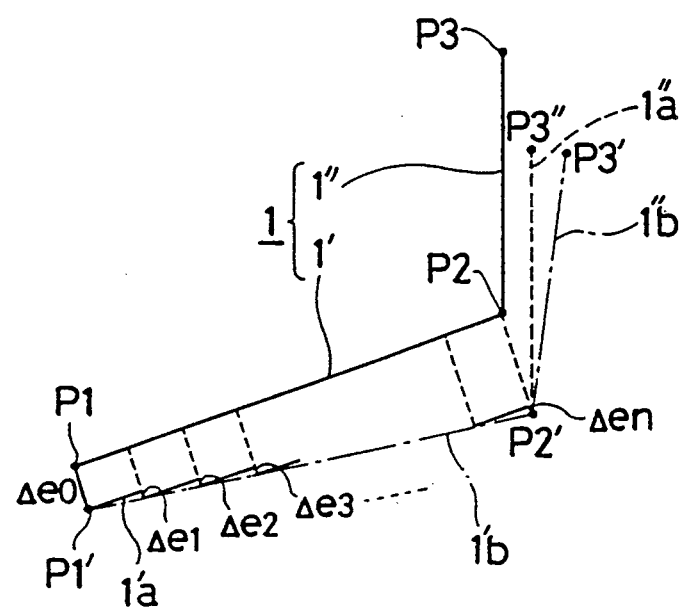
FIG. 4 is a diagram illustrating an operation of the welding robot of FIG. 1 when a desired weld line includes two linear sections.

First, an operator sets a workpiece in a predetermined positional relation to the welding robot, and sets the start and end points and weaving width for individual sections of the desired weld line and other control parameters through the teaching operator panel 24 etc., thereby teaching the robot a welding program. The desired weld line (generally indicated by reference numeral 1 in FIG. 1) of this embodiment comprises, as shown in FIG. 4, a desired weld line 1' in a first linear section having a start point P1 and an end point P2, and a desired weld line 1'' in a second linear section having a start point P2 and an end point P3. The operator then starts operating the welding robot.

When the welding robot is operated, the CPU 21 reads the first one block of the taught welding program (Step S1), determines the desired weld line 1' on the basis of the start and end points P1 and P2 of the first section specified in this block, and detects the operating states of the various operating sections of the robot mechanism 30 including the wrist portion, to thereby detect the orientation of the welding torch 41. Preferably, prior to the orientation detection, the distal end of the welding torch 41 is positioned at the start point P1. Subsequently, based on the desired weld line 1' and the orientation of the welding torch, a weaving swing plane (generally indicated by reference numeral 6 in FIG. 1) of the first section is obtained (Step S2). More specifically, a first plane 3 traversing the desired weld line 1' at right angles thereto and passing the distal end of the welding torch 41 and a second plane 4 perpendicular to the axis 2 of the welding torch 41 and passing the distal end thereof are obtained. Then, a plane including a line 5 of intersection of the first and second planes 3 and 4 and parallel to the desired weld line 1' is obtained as the weaving swing plane 6 (hatched in FIG. 1).

The CPU 21 then drives the servomotors for the individual axes of the robot mechanism 30 through the axis controller 26 and the servo-circuits 27, such that the welding torch 41 with the previously set weaving width in a direction traversing the desired weld line 1' and at the same time is moved along the desired weld line 1' and the distal end of the welding torch 41 is moved on the weaving swing plane 6. At the same time, the CPU 21 sends a welding command to the arc welding power controller 40 through the welding machine interface 28. As a consequence, weaving welding for the first section is started (Step S3).

During the weaving welding, the CPU 21 periodically detects a deviation of the desired weld line 1' from the center line of the groove of the workpiece as caused by a setting error of the workpiece, etc., and corrects the welding direction in accordance with the detection result, as conventionally known. More specifically, at the start of welding, the CPU 21 corrects the start point P1 by a correction amount $\Delta e0$ corresponding to the deviation between the start point P1 of the desired weld line 1' and a start point P1' on the center line of the groove, detected by suitable means (not shown). Thereafter, the CPU 21 corrects the desired weld line 1' sequentially by correction amounts $\Delta e1, \Delta e2, \Delta e3, \ldots \Delta en$ which correspond respectively to the deviations detected based on the welding current values read periodically through the welding machine interface 28. A desired weld line 1'a after the correction corresponds to a line obtained by parallel-moving the desired weld line 1' by the integrated value of correction values obtained at the time of the correction. Then, the CPU 21 drives the servomotors of the respective axes to move the distal end of the welding torch 41 substantially along the center line 1'b of the groove of the workpiece starting at P1' and terminating at P2', and stores the integrated value of the correction values in a register R (Step S4). Preferably, the weaving swing plane 6 is corrected in accordance with the desired weld line 1'a after correction.

After executing Step S4, the CPU 21 determines whether the end point after correction (indicated approximately by reference symbol P2') of the first section specified in the block read in Step S1 has been reached (Step S5). Step S4 is repeated until the desired end point P2' is reached.

When the desired end point P2' is reached, the CPU 21 reads the next block of the taught welding program (Step S6), and determines whether this block contains a weaving end command (Step S7).

In the illustrated embodiment, a block corresponding to the second block is read in Step S6, and accordingly, the determination in Step S6 is negative. The CPU 21 adds the integrated value $\Delta E (=\Delta e1+\Delta e2+\ldots +\Delta en)$ of correction values obtained at the end of execution of the first block, to each of the start and end points P2 and P3 of the second section specified in the second block, to obtain a start point P2' after correction and an end point P3'' after provisional correction. Then, the CPU 21 determines a desired weld line 1''a after provisional correction on the basis of P2' and P3'' and detects the orientation of the welding torch 41 (Step S8).

Next, Step S2 is executed to obtain a weaving swing plane 6 for the second section in accordance with the desired weld line 1''a after provisional correction and the orientation of the welding torch (Step S2), and the process following Step S3 is executed.

During the weaving welding of the second section, the CPU 21 periodically detects and corrects the deviation of the desired weld line 1''a after provisional correction from the center line 1''b of the groove of the workpiece, and drives the servomotors of the respective axes such that the distal end of the welding torch 41 is moved substantially along the center line 1"b of the groove of the workpiece starting at P2' and terminating at P3'. Preferably, the weaving swing plane 6 is corrected on the basis of a desired weld line (corresponding to the groove center line 1"b) obtained by correcting the desired weld line 1"a after provisional correction in accordance with the above-mentioned deviation.

When the desired end point after correction (indicated approximately by reference symbol P3') of the second section is reached, a weaving end command contained in the next block of the welding program is read (Step S7) and thus the weaving welding is ended.

The foregoing embodiment is described with reference to the desired weld line having two linear sections, but the weaving welding method of the present invention is similarly applicable to a desired weld line having a single section or three or more sections. The single section may be a straight line or an arc, and a plurality of sections may be a combination of straight lines and/or arcs. When the desired weld line itself or a section thereof is an arc, the weaving swing plane is determined similar to the case of a linear weld line, but using a line tangential to the arc as the desired weld line.

Figure 3:
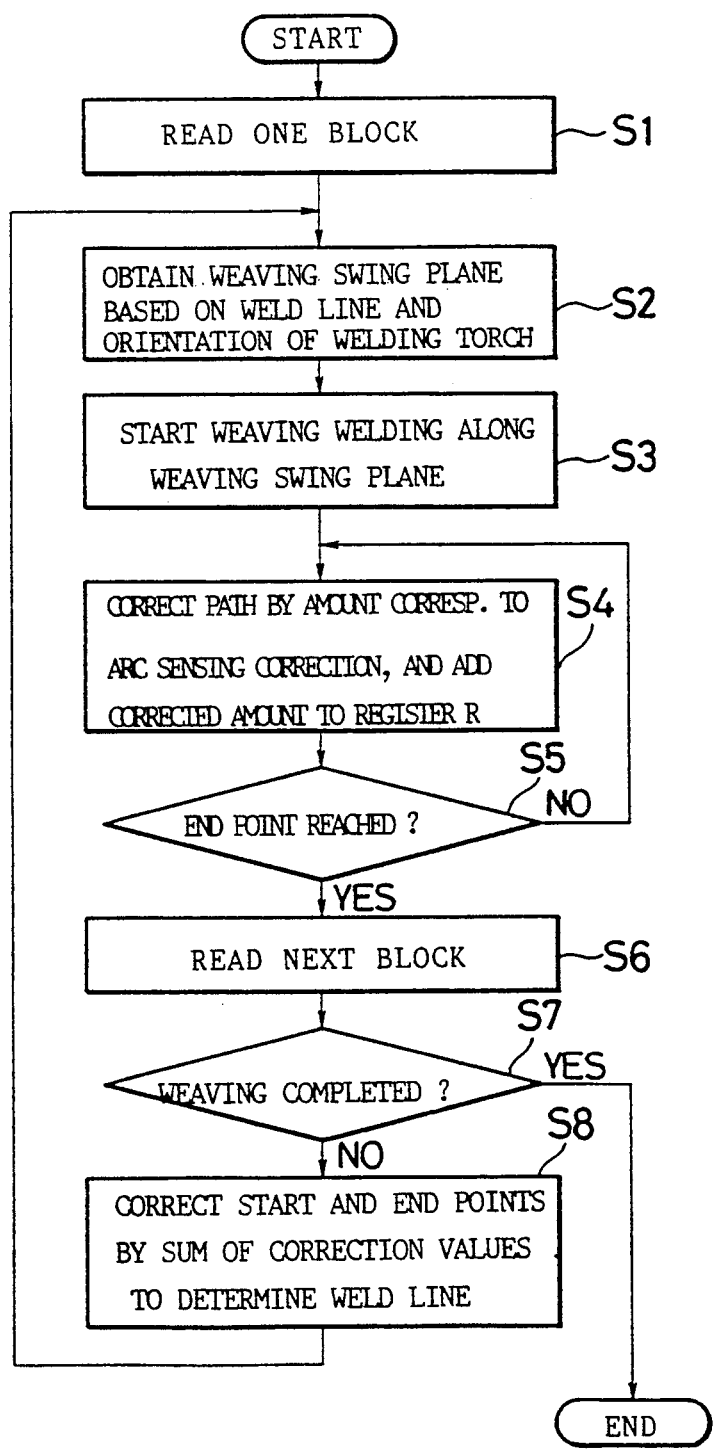
FIG. 3 is a flowchart of a control program executed by the welding robot of FIG. 2.

In the above embodiment, the desired weld line is corrected in accordance with the detected value of the welding current, but this correction is not essential and in this case, Steps S4 and S8 in FIG. 3 are unnecessary.

We claim:

1. A weaving welding method comprising the steps of:
   (a) determining a desired weld line;
   (b) detecting an orientation of a welding torch relative to the weld line;
   (c) determining a weaving swing plane on the basis of the desired weld line and the detected orientation of said welding torch, said weaving swing plane including an intersecting line at which a first plane traversing said desired weld line at right angles thereto intersects a second plane perpendicular to an axis of said welding torch, and parallel to said desired weld line; and
   (d) moving said welding torch along said desired weld line while weaving the same with a predetermined width with respect to said desired weld line in a direction traversing said desired weld line, to move the distal end of said welding torch on said weaving swing plane.

2. The weaving welding method according to claim 1, wherein said desired weld line includes a plurality of sections each comprising one of a straight line and an arc, and said steps (a) through (d) are executed for each of said plurality of sections.

3. The weaving welding method according to claim 2, further including the steps of: (e) correcting a deviation of said desired weld line from the center line of a groove of a workpiece; (f) integrating a correction amount of each section; and (g) correcting the desired weld line of each section in accordance with the integrated value of correction amounts obtained in each preceding section.

4. A weaving welding method comprising the steps of:
   setting a workpiece in a predetermined positional relationship relative to a welding robot;
   determining a desired weld line based on predetermined starting and stopping points and a weaving width for individual sections of the desired weld line;
   positioning a welding torch of the welding robot at the starting point of a first section of the desired weld line;
   detecting the orientation of the welding torch relative to the desired weld line;
   determining a weaving swing plane on the basis of the desired weld line and the detected orientation of said welding torch, said weaving swing plane including an intersecting line at which a first plane traversing said desired weld line at right angles thereto intersects a second plane perpendicular to an axis of said welding torch, and parallel to said desired weld line; and
   moving said welding torch along said desired weld line while weaving the same with a predetermined width with respect to said desired weld line in a direction traversing said desired weld line, to move the distal end of said welding torch on said weaving swing plane.

5. The weaving welding method according to claim 4, wherein said desired weld line includes a plurality of sections each comprising one of a straight line and an arc, and said steps (a) through (d) are executed for each of said plurality of sections.

6. The weaving welding method according to claim 5, further including the steps of: (e) correcting a deviation of said desired weld line from the center line of a groove of a workpiece; (f) integrating a correction amount of each section; and (g) correcting the desired weld line of each section in accordance with the integrated value of correction amounts obtained in each preceding section.

* * * * *

UNITED STATES PATENT AND TRADEMARK OFFICE
CERTIFICATE OF CORRECTION

PATENT NO. : 5,063,281

DATED : November 5, 1991

INVENTOR(S) : Mizuno et al.

It is certified that error appears in the above-identified patent and that said Letters Patent is hereby corrected as shown below:

Col. 1, line 38, "groove moreover," should be -- groove. Moreover--.

Col. 2, line 32, "arcs, based on a simple teaching" should be --arcs.--.

Col. 3, line 68, after "41" insert --weaves--.

Signed and Sealed this

Thirtieth Day of March, 1993

Attest:

STEPHEN G. KUNIN

Attesting Officer  Acting Commissioner of Patents and Trademarks